(12) United States Patent
Sato et al.

(10) Patent No.: US 8,138,442 B2
(45) Date of Patent: Mar. 20, 2012

(54) WIRE ELECTRIC DISCHARGE MACHINING METHOD, SEMICONDUCTOR WAFER MANUFACTURING METHOD, AND SOLAR BATTERY CELL MANUFACTURING METHOD

(75) Inventors: Tatsushi Sato, Tokyo (JP); Yoshihito Imai, Tokyo (JP); Teiji Takahashi, Tokyo (JP); Takeshi Sakata, Tokyo (JP); Tomoko Sendai, Tokyo (JP); Yoichiro Nishimoto, Tokyo (JP); Shigeru Matsuno, Tokyo (JP); Takeyuki Maegawa, Tokyo (JP); Takaaki Iwata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 658 days.

(21) Appl. No.: 12/093,836

(22) PCT Filed: Nov. 16, 2005

(86) PCT No.: PCT/JP2005/021002
§ 371 (c)(1),
(2), (4) Date: Apr. 1, 2009

(87) PCT Pub. No.: WO2007/057948
PCT Pub. Date: May 24, 2007

(65) Prior Publication Data
US 2009/0212026 A1    Aug. 27, 2009

(51) Int. Cl.
*B23H 7/02*       (2006.01)
*H01L 21/301*     (2006.01)
*H01L 21/306*     (2006.01)
*B23H 9/00*       (2006.01)

(52) U.S. Cl. ............ 219/69.17; 219/69.12; 438/460
(58) Field of Classification Search ............ 219/69.12, 219/69.17, 69.18; 438/460, 466, 469
See application file for complete search history.

(56) References Cited

U.S. PATENT DOCUMENTS
5,429,984 A  *  7/1995  Masaki ............ 219/69.17

FOREIGN PATENT DOCUMENTS
JP      9-248719 A      9/1997
(Continued)

OTHER PUBLICATIONS
Luo et al., "Investigation of silicon wafering by wire EDM", Dec. 1992, Journal of Materials Science, vol. 27, No. 21, pp. 5805-5810.*
(Continued)

*Primary Examiner* — Geoffrey S Evans
(74) *Attorney, Agent, or Firm* — Leydig, Voit & Mayer, Ltd.

(57) ABSTRACT

Provided are a wire electric discharge machining method for poorly conductive materials, such as solar cell silicon, and a semiconductor wafer manufacturing method and a solar battery cell manufacturing method based on the wire electric discharge machining method. Electrical discharge machining of a high volume resistivity, hard and brittle materials, having a volume resistivity that is equal to or higher than 0.5 Ω·cm and equal to or lower than 5 Ω·cm is performed by applying a pulse voltage having a pulse width that is equal to or higher than 1 μsec and equal to or lower than 4 μsec and having a peak current at the time of machining a wire electrode that is equal to or higher than 10A and equal to or lower than 50A to a wire electrode and generating a discharge pulse between the wire electrode and a subject to be machined.

11 Claims, 7 Drawing Sheets

FOREIGN PATENT DOCUMENTS

| | | |
|---|---|---|
| JP | 9-253935 A | 9/1997 |
| JP | 2000-263545 A | 9/2000 |
| JP | 2000-263545 A * | 9/2000 |

OTHER PUBLICATIONS

Heeren et al., "Three dimensional silicon micromechanical parts manufactured by electro-discharge machining", IEEE, Dec. 1997, pp. 247-252.*

Uno et al. in the article "High Performance Slicing Method of Monocrystalline silicon ingot by wire EDM" in Initiatives of Precision Engineering at the Beginning of the millenium, Dec. 2002, pp. 219-223.*

Peng et al., "Study of electrical discharge machining technology for slicing ingots", Dec. 2003, Journal of Materials Processing Technology, vol. 140, pp. 274-279.*

Reporting Session on Results of "Technical Development and Field Test Project of Photovoltaic Power Generation" in 2004.

* cited by examiner

| No | MACHINING FLUID | CURRENT LIMIT RESISTOR VALUE [Ω] | POSITIVE GROUP PULSE OPEN VOLTAGE [V] | POSITIVE GROUP PULSE ON TIME [μsec] | POSITIVE GROUP PULSE OFF TIME [μsec] | POSITIVE GROUP PULSE ON/OFF NUMBER | DOWNTIME AFTER POSITIVE VOLTAGE APPLICATION [μsec] | NEGATIVE GROUP PULSE OPEN VOLTAGE [V] | NEGATIVE GROUP PULSE ON TIME [μsec] | NEGATIVE GROUP PULSE OFF TIME [μsec] | NEGATIVE GROUP PULSE ON/OFF NUMBER | PEAK CURRENT [A] | DOWNTIME AFTER NEGATIVE VOLTAGE APPLICATION [μsec] | GROUP PLUS ONE DURATION TIME [μsec] | MACHINING SPEED [mm²/min] |
|---|---|---|---|---|---|---|---|---|---|---|---|---|---|---|---|
| 1 | AQUEOUS | 8 | 100 | 1 | 1 | 15 | 30 | 100 | 1 | 1 | 15 | 12.5 | 30 | 30/30 | 11.25 |
| 2 | AQUEOUS | 8 | 100 | 1 | 1 | 10 | 30 | 100 | 1 | 1 | 15 | 12.5 | 30 | 20/30 | 12 |
| 3 | AQUEOUS | 8 | – | – | – | – | – | 100 | 1 | 1 | 15 | 12.5 | 30 | 30 | 12 |
| 4 | AQUEOUS | 8 | – | – | – | – | – | 100 | 1 | 1 | 15 | 12.5 | 80 | 30 | 25.5 |
| 5 | AQUEOUS | 8 | – | – | – | – | – | 100 | 1 | 1 | 30 | 12.5 | 80 | 60 | 15.75 |
| 6 | AQUEOUS | 8 | – | – | – | – | – | 100 | 2 | 1 | 8 | 12.5 | 80 | 24 | 27 |
| 7 | AQUEOUS | 8 | – | – | – | – | – | 100 | 2 | 1 | 10 | 12.5 | 80 | 30 | 28.5 |
| 8 | AQUEOUS | 8 | – | – | – | – | – | 150 | 2 | 2 | 8 | 18.8 | 70 | 32 | 33.75 |
| 9 | AQUEOUS | 4 | – | – | – | – | – | 150 | 2 | 2 | 8 | 37.5 | 70 | 32 | 42 |
| 10 | AQUEOUS | 2 | – | – | – | – | – | 150 | 2 | 2 | 8 | 75.0 | 70 | 32 | MACHINING DISENABLE |
| 11 | AQUEOUS | 2 | – | – | – | – | – | 100 | 2 | 2 | 8 | 50.0 | 70 | 32 | 15.75 |
| 12 | AQUEOUS | 16 | – | – | – | – | – | 150 | 2 | 2 | 8 | 9.4 | 70 | 32 | 18 |
| 13 | AQUEOUS | 4 | – | – | – | – | – | 150 | 4 | 4 | 8 | 37.5 | 140 | 64 | 12.75 |
| 14 | AQUEOUS | 4 | – | – | – | – | – | 150 | 6 | 6 | 8 | 37.5 | 210 | 96 | MACHINING DISENABLE |
| 15 | OIL | 4 | – | – | – | – | – | 150 | 2 | 2 | 8 | 37.5 | 70 | 32 | 28.5 |

Fig. 3

WIRE ELECTRIC DISCHARGE MACHINING METHOD, SEMICONDUCTOR WAFER MANUFACTURING METHOD, AND SOLAR BATTERY CELL MANUFACTURING METHOD

BACKGROUND OF THE INVENTION

1. Field of the Invention

The present invention relates to a wire electric discharge machining method for a poor conductive material such as a solar cell silicon, and a semiconductor wafer manufacturing method and a solar battery cell manufacturing method which are based on the wire electric discharge method.

2. Description of the Related Art

In the case where wire electric discharge is applied to a low volume resistance material such as a die material, deionization water is used as a machining fluid, and a power supply that is high in current peak value and short in pulse width is generally used as the machining conditions (see *Electric Machining Journal* Vo. 34, No. 75, 2000, lines 26 to 28 on left column of page 15). As a result, the discharge state is stabilized, and a high machining speed is obtained. The above machining conditions are suitable for "rough machining" because of its high speed property (This is also called "first cut" or "rough cut." On the contrary, a machining that generates the discharge of a small energy while traveling a wire so as to skim over a machined surface to remove a small amount of the workpiece on the machined surface, to thereby improve a surface roughness in the machined surface is called "finishing"). However, when the above so-called rough machining conditions of the high peak and the short pulse current are applied to machining of the high volume resistivity material such as the solar cell silicon, which is equal to or higher than about 0.5 $\Omega \cdot cm$, the break of the wire frequently occurs, thereby disenabling the machining.

Also, there have been reported an example in which a low peak current condition such as 0.1 A is applied to the slice machining of a silicon material having a relatively low volume resistivity of about $10^{-2}$ $\Omega \cdot cm$, which is used for epitaxial wafer (see JP 09-248719 A, lines 2 to 9 of page 4), and an example in which the machining conditions such as a long pulse width (5 μsec to several tens μsec) and a low peak current (22 A or lower) are applied to the slice machining, and a deionization water is used as a machining fluid to conduct the discharge machining (see *Electric Machining Journal* Vo. 34, No. 75, 2000, lines 4 to 5 on left column of page 16, lines 7 to 24 on right column of the same page). However, there has been presumed that it is difficult to conduct the above discharge machining on the high volume resistivity material that is equal to or higher than about 0.5 $\Omega \cdot cm$ such as the solar cell silicon material (see *Electric Machining Journal* Vo. 30, No. 65, 1996, lines 11 to 15 on left column of page 11, and FIG. 2).

On the other hand, in the wire discharge machining for the insulating material, decomposed carbon that has been produced by thermal action of the discharge machining in an oil machining fluid is attached onto the surface of the workpiece, and discharge is continued by using the electric conductivity of the attached carbon (for example, see JP 09-253935 A, summary). There has been presumed that it is difficult to machine the high volume resistivity material such as the solar cell silicon, which is equal to or higher than about 0.5 $\Omega \cdot cm$ by methods other than the machining method conforming to the insulating material.

In the method where the decomposed carbon that has been produced by thermal action of the discharge is attached onto the surface of the workpiece, and discharge is continued by using the electric conductivity to machine the workpiece, the machining speed is low, and its practical use is limited. Also, in the above method, instead of the deionization water that is generally used in the wire discharge machining, the oil machining fluid is used, so a user becomes strained in the fire prevention, the treatment of the machining fluid complement, the environmental protection, and the like.

SUMMARY OF THE INVENTION

The present invention has been made to solve the above problems, and therefore an object thereof is to machine a poor conductive material that is equal to or higher than 0.5 $\Omega \cdot cm$, which is represented by a solar cell silicon, at a practically sufficient speed not only in a case where an oil machining fluid but also the deionization water is used.

A wire electric discharge machining method according to a first aspect of the present invention includes: applying a pulse voltage having a pulse width that is equal to or higher than 1 μsec and equal to or lower than 4 μsec, and having a peak current at the time of machining a wire electrode that is equal to or higher than 10 A and equal to or lower than 50 A to the wire electrode; and generating an electric discharge pulse between the wire electrode and an object to be machined having a volume resistivity that is equal to or higher than 0.5 $\Omega \cdot cm$ and equal to or lower than 5 $\Omega \cdot cm$ to machine the object to be machined.

A solar battery cell manufacturing method according to a second aspect of the present invention includes implementing a texturing process by using a metal component that is attached to a machined surface of a solar cell semiconductor wafer as a mask after applying electric discharge machining to a light receiving surface of the solar cell semiconductor wafer.

According to the first aspect of the present invention, even if not only the oil fluid but also the deionization water is used for the machining fluid with respect to a high resistance material, it is possible to conduct discharge machining at a practically sufficient speed without a wire rupture. Also, because the discharge machining can be conducted at a practically sufficient speed without any damage with respect to a hard and brittle material, the present invention can be applied to manufacture of a semiconductor wafer or a solar battery cell.

According to the second aspect of the present invention, because a metal component that has been attached onto a machined surface by the discharge machining can be used as a mask, it is possible to reduce time and cost of the mask manufacture, to thereby readily form a texture having fine concave/convex on the light receiving surface. With the above configuration, it is possible to readily manufacture the solar battery cell which suppresses the reflection on the light receiving surface and has high power generation efficiency.

BRIEF DESCRIPTION OF THE DRAWINGS

In the accompanying drawings:

FIG. 3 is a diagram showing a relationship between machining conditions and a machining speed according to the first embodiment of the present invention;

DETAILED DESCRIPTION OF THE PREFERRED EMBODIMENTS

First Embodiment

Figure 1:
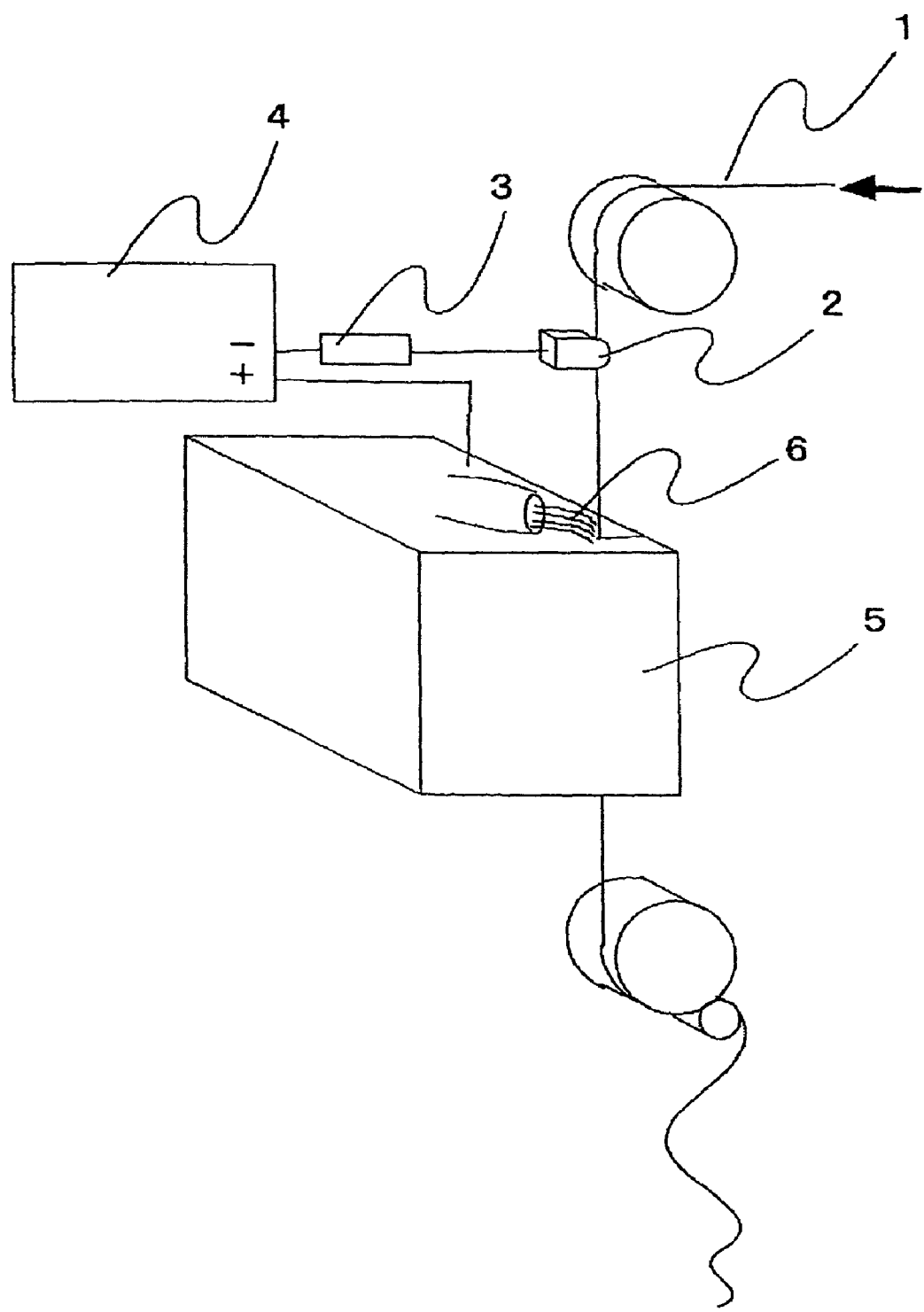
FIG. 1 is a diagram showing a slice process according to a first embodiment of the present invention.

According to a first embodiment of the present invention, an electric discharge machining is conducted on a high volume resistivity material under the conditions in which an electric discharge pulse from a wire electrode is a low-peak and short pulse. FIG. 1 is a diagram showing a slice process of the high volume resistivity material according to the first embodiment of the present invention. Referring to FIG. 1, reference numeral 1 denotes a wire electrode, reference numeral 2 denotes a feeder for supplying a current from a machining power supply that will be described later to the wire electrode 1, reference numeral 3 denotes a current limit resistor that is located for limiting a current that is supplied to the wire electrode 1, reference numeral 4 denotes a machining power supply that supplies an electric discharge current used for electric discharge machining to the wire electrode 1 through the current limit resistor 3 and the feeder 2, and reference numeral 5 denotes a workpiece, which is a silicon block with a high volume resistivity in this example. Reference numeral 6 denotes a machining fluid that is poured into a portion to be machined between the workpiece 5 and the wire electrode 1. The wire electric discharge machine is an apparatus that machines the workpiece 5 by discharging between the wire electrode 1 and the workpiece 5, and includes the wire electrode 1, the feeder 2, the current limit resistor 3, and the machining power supply 4.

The operation of the first embodiment according to the present invention will be described below with reference to FIG. 1. The wire electrode 1 made of metal is connected to one electrode of the machining power supply 4 through the feeder 2 and the current limit resistor 3 and runs in a longitudinal direction of the wire electrode. The workpiece 5 is connected to another electrode of the machining power supply 4, and a relative position between the workpiece 5 and the wire electrode 1 is always controlled by a control unit (not shown) so that the workpiece 5 is disposed opposite to the wire electrode 1 with a slight distance. The insulating machining fluid 6 is supplied between the wire electrode 1 and the workpiece 5. The supply of the machining fluid 6 can be conducted by spraying the machining fluid 6 between the wire electrode 1 and the workpiece 5 by a nozzle, or by locating the wire electrode 1 and the workpiece 5 within a machining tank (not shown), and filling the machining tank with the machining fluid 6. The machining power supply 4 develops a short-peak and short-pulse electric discharge that will be described later between the wire electrode 1 and the workpiece 5 through the current limit resistor 3. The workpiece 5 is melted and removed around the wire electrode 1 by the developed electric discharge. However, because the position of the workpiece 5 is controlled so that the workpiece 5 is not too away from the wire electrode 1, the workpiece 5 is moved toward the wire electrode 1 by the removed amount. Because the above operation is sequentially repeated, the workpiece 5 is machined in a slit configuration. When an end surface of the workpiece 5 or a portion closest to the machined slit is subjected to slit machining in parallel, silicon is machined in a slice configuration in the form of a wafer.

Figure 2:
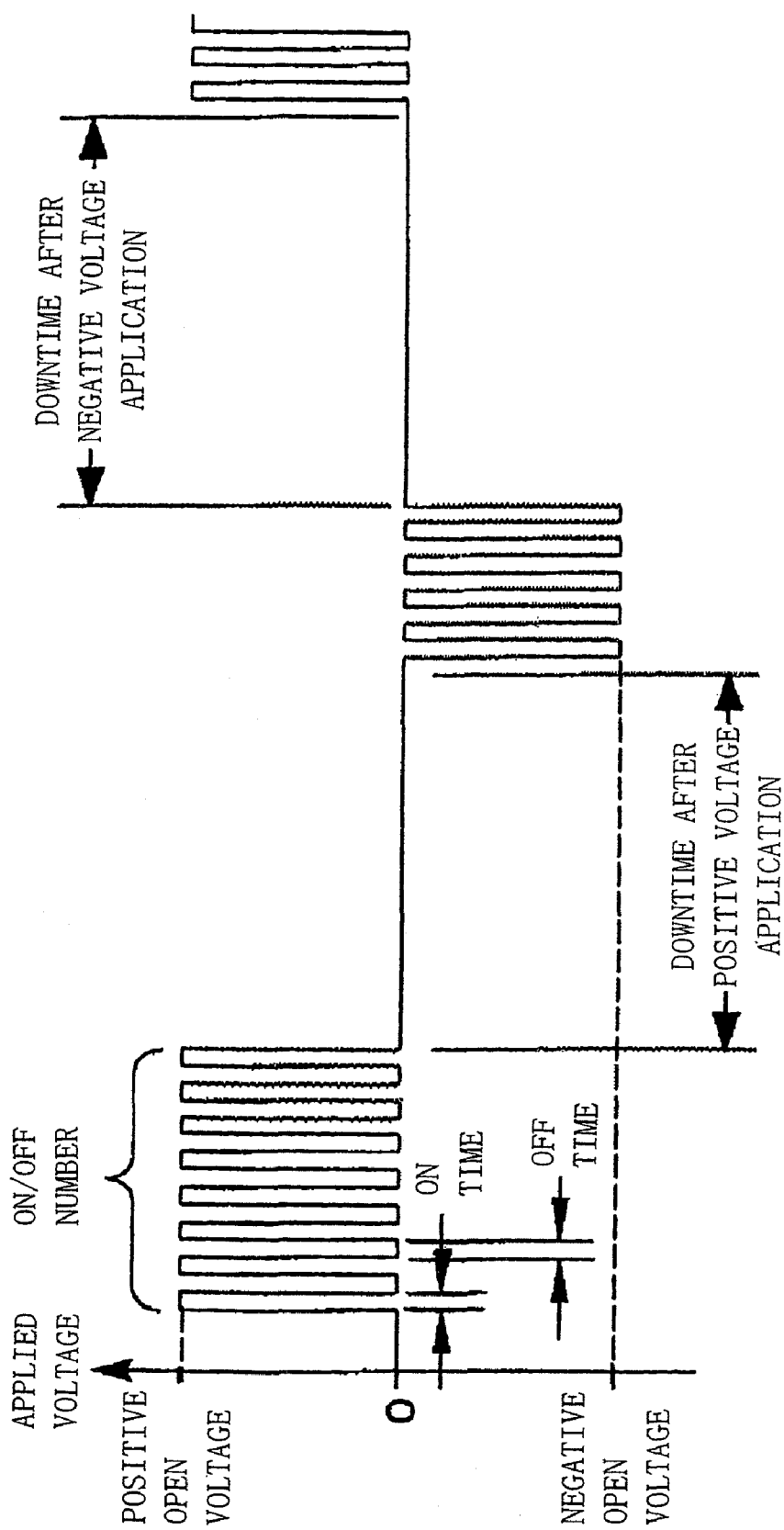
FIG. 2 is a diagram showing a pulse voltage waveform according to the first embodiment of the present invention.

Subsequently, the above low-peak and short-pulse machining conditions will be described. FIG. 2 is a conceptual diagram showing a group pulse voltage waveform that is applied to the wire electrode 1 according to the first embodiment of the present invention. The pulse voltage waveform is different from the pulse current waveform at the time of discharging. Because the pulse current waveform rises upon starting the discharge after the pulse voltage waveform is applied, the width of the pulse current is normally smaller than the width of the pulse voltage. Accordingly, when the pulse voltage width that is applied to the wire electrode 1 is made smaller, and the current peak value is suppressed to a lower value by means of the current limit resistor 3, the discharge current waveform becomes a low-peak and short pulse waveform. The reasons that the machining conditions are the low-peak and short pulse current will be described below.

When the rough machining conditions such as the high-peak and short pulse current are applied to the machining of the high volume resistivity material that is equal to or higher than about 0.5 Ω·cm as in the solar cell silicon, the break of the wire electrode 1 frequency occurs, thereby making it difficult to continue the machining. It is estimated that the reasons are that because the solar cell silicon is high in volume resistivity, when a large current of the high-peak and short pulse which are the rough machining conditions is supplied, an electric discharge portion is heated and becomes high in temperature by a large amount of Joule heat that is generated in the material, so the electric discharge is concentrated to the portion, and, as a result, wire is broken. Also, even if the electric discharge concentration state can be avoided by lowering the electric discharge frequency. It is estimated that the possibility that the wafer is damaged is high when a large amount of energy is supplied by one electric discharge operation because silicon is a hard and brittle material. The same is applied to a case of the machining under the low-peak and long pulse conditions. From the above viewpoints, it is estimated that the high-peak and short pulse current conditions or the low-peak and long pulse current conditions are not suitable for the slice machining of the high volume resistivity material which is equal to or higher than about 0.5 Ω·cm.

On the other hand, the melting point of silicon is not higher than that of steel, and silicon is a hard and brittle material. Therefore, it is presumed that the periphery of the melted portion due to the electric discharge is damaged by thermal impact. As a result, it is presumed that a machining energy required for practically realizing the machining speed is not so large. Accordingly, a method of increasing an electric discharge repetitive frequency to improve the machining speed while generating the electric discharge pulse of a small current to prevent the break of the wire and the damage to the wafer, that is, a method of generating the low-peak and short pulse current at a high repetitive frequency is suitable for the above machining. In other words, although the solar cell silicon slice machining is a rough machining process, the measures in which the finishing conditions such as the low-peak and short pulse which reduces the energy that is used for one electric discharge operation are applied, which seemingly lacks in common sense from the conventional common sense of the electric discharge machining field are suitable as the machining conditions. A description will be given of a slice machining experiment that is implemented for obtaining the machining conditions such as the low-peak and short pulse that is applied to the rough machining related to the present invention on the basis of the above study.

A table shown in FIG. 3 summarizes the slice machining experiment results conducted by applying a group pulse voltage shown in FIG. 2 to the wire electrode 1 by the aid of the machine shown in FIG. 1, and shows a relationship between the machining condition and the machining speed. The used workpiece 5 is a solar cell polycrystal silicon block having a slice machined surface of 150 mm×150 mm and a volume resistivity of 1.2 Ω·cm. The "current limit resistor" in the table is connected in series with an electric discharge circuit as has been already described above, and is a resistor that limits a current value that flows by the voltage applied to the wire electrode 1 to realize the low peak current, and "open voltage" is a peak value of the pulse voltage that is applied to the wire electrode 1. The current that flows in the wire electrode 1 at the time of electric discharge does not exceed a value obtained by dividing the "open voltage value" by the "current limit resistor" value, but in the table, the value is represented as "peak current". An "on time" is a period of time during which the pulse is on in the group pulse, which is equal to the pulse width. Also, an "off time" is a period of time during which the pulse is off between the adjacent pulses in the group pulse. The "on/off number" represents the number of paired on/off of pulses which are included in one group pulse, which is equal to the number of included pulses. A value obtained by multiplying the on/off number by a total value of the "on time" and the "off time" is a "group pulse one duration time". A "downtime" is a time between a group pulse end time point and a start time point of a subsequent group pulse. The "downtime" shown in FIG. 2 indicates that one group pulse first starts from the off state, then becomes the on state, and finally ends when the on state is ended. A "positive side group pulse" and a "negative side group pulse" indicate whether the voltage value of the pulse that is applied to the wire electrode 1 is positive or negative, respectively. An "aqueous" described on the column of "machining fluid" indicates deionization water, and "machining speed" is a machining speed obtained when machining is conducted under the machining conditions described on the respective lines in the table. When a time required for slice machining the slice machined surface of at the smallest size on the market presently, that is, the size of 125 mm×125 mm is within 24 hours as a guide, it is preferable that the "machining speed" is equal to or higher than 11 mm²/min. Also, in the table, Nos. 1 and 2 experiment while the pulse polarities are alternately inversed to the positive side and the negative side in each of the group pulses, and No. 3 and the subsequent Nos. experiment by using the group pulse of the negative side.

The following features can be extracted from FIG. 3.

(1) When the machining conditions are that in a case where the pulse width of the pulse voltage that is applied to the wire electrode 1 is equal to or higher than 1 μsec and equal to or lower than 4 μsec, and the peak current is equal to or higher than 12 A and equal to or lower than 50 A, the machining speed satisfies 11 mm²/min or higher. In the table, all of the cases except for NOs. 10 and 14 describing "machining disabled" correspond to the conditions. Even if the peak current is set to 10 A, the machining speed close to the 11 mm²/min can be ensured although the machining speed is slightly smaller than the above preferable machining speed 11 mm²/min. As a result, the lower limit value of the peak current can be set to 10 A.

(2) Even if the peak current is equal to or lower than 50 A, when the pulse width exceeds 4 μsec, the machining is disabled, that is, the break of the wire frequently occurs (refer to No. 14).

(3) Even if the pulse width is equal to or lower than 4 μsec, when the peak current exceeds 50 A, the machining is disabled, that is, the break of the wire frequently occurs (refer to No. 10).

(4) The best machining speed in the experimental conditions is under the condition of No. 9 in which the aqueous machining fluid is used, and the open voltage is 150 V, the current limit resistance is 4Ω (peak current is 37.5 A), the unipolar pulse is used, the respective on/off times are 2 μsec (repetitive frequency 250 kHz), the on/off number is 8, and the downtime is 70 μsec.

(5) The machining speed is improved when the downtime is made longer than one duration time of the group pulse as compared with when the downtime is made equal to or lower than one duration time of the group pulse to increase the electric discharge frequency of the group pulse.

It is presumed that the above effect is caused by setting the downtime to be longer to promote the cooling of the wire and the workpiece.

The effects of the downtime are understood from the following data in the table.

Nos. 1 and 2: In No. 1 data, the downtime after the application of the group pulse is identical with the group pulse one duration time in both of positive and negative. However, in No. 2 data, the downtime after the application of the positive group pulse is made longer than one duration time of the positive group pulse. As a result, the machining speed of No. 2 is improved as compared with the case of No. 1 although being slight.

Nos. 3, 4, and 5: Each of Nos. 3, 4, and 5 is a case of the monopolar pulse, and No. 3 is a case in which the downtime and the group pulse one duration time are identical with each other, and Nos. 4 and 5 are a case in which the downtime is set to be longer than the group pulse one duration time. In both of Nos. 4 and 5, the machining speed is improved more than the machining speed of No. 3. Even when the group pulse one duration time changes from 30 μsec to 60 μsec, the same effects are recognized.

(6) In both of the monopolar pulse and the bipolar pulse, the machining speed is equal to or higher than 11 mm²/min so far as the above condition (1) is satisfied. Also, the machining by the aid of the monopolar pulse improves the machining speed slightly more than the machining by the aid of the bipolar pulse. It is presumed that this is because an object to be machined is p-type silicon, and therefore the case of the monopolar pulse which applies only the pulse where the electric potential of the wire is set to be lower than the workpiece is better in machining condition than the case of the bipolar pulse which applies the pulses alternately to the positive side and the negative side.

(7) Even if the machining fluid is not limited to oil but is aqueous so far as the condition of the above condition (1) is satisfied, the machining speed is equal to or higher than 11 mm²/min. In addition, the machining speed in a case of using the aqueous machining fluid is improved more than that in a case of using the oil machining fluid (refer to Nos. 9 and 15 for comparison).

FIG. 3 shows the results of the experiments using the silicon block having a volume resistivity of 1.2 Ω·cm. The same effects are obtained from the workpiece having a volume resistivity of 0.5 Ω·cm to 5 Ω·cm.

Accordingly, in the configuration according to the first embodiment of the present invention as shown in FIG. 1, the group pulse voltage having a pulse width equal to or higher than 1 μsec but equal to or lower than 4 μsec and a peak current of the electric discharge in a range from 10 to 50 A is applied to the wire electrode 1. As a result, the electric discharge of a small energy with a low-peak and short pulse repeatedly generates with respect to the workpiece at a high frequency, so even if not only the oil fluid but also the deionization water is used for the machining fluid with respect to the high volume resistivity hard and brittle material of 0.5 Ω·cm to 5 Ω·cm such as the solar cell silicon, the electric discharge machining can be conducted at a practically sufficient speed with no break of the wire and no damage of the silicon wafer. Also, because the wire electric discharge machining is a non-contact machining, it is possible to thin the silicon wafer and reduce a kerf loss, thereby making it possible to realize a reduction in the costs of the solar cell.

The machining process is improved more when the downtime is made longer with respect to one duration time of the group pulse, and the case of the monopolar pulse improves the machining process slightly more than the case of the bipolar pulse. The polarity slightly depends on any one of n-type and p-type of the workpiece.

The embodiment of the present invention is not limited to the slice machining but is applicable to any machining, and the same effects as those described above can be obtained.

Second Embodiment

Figure 4:
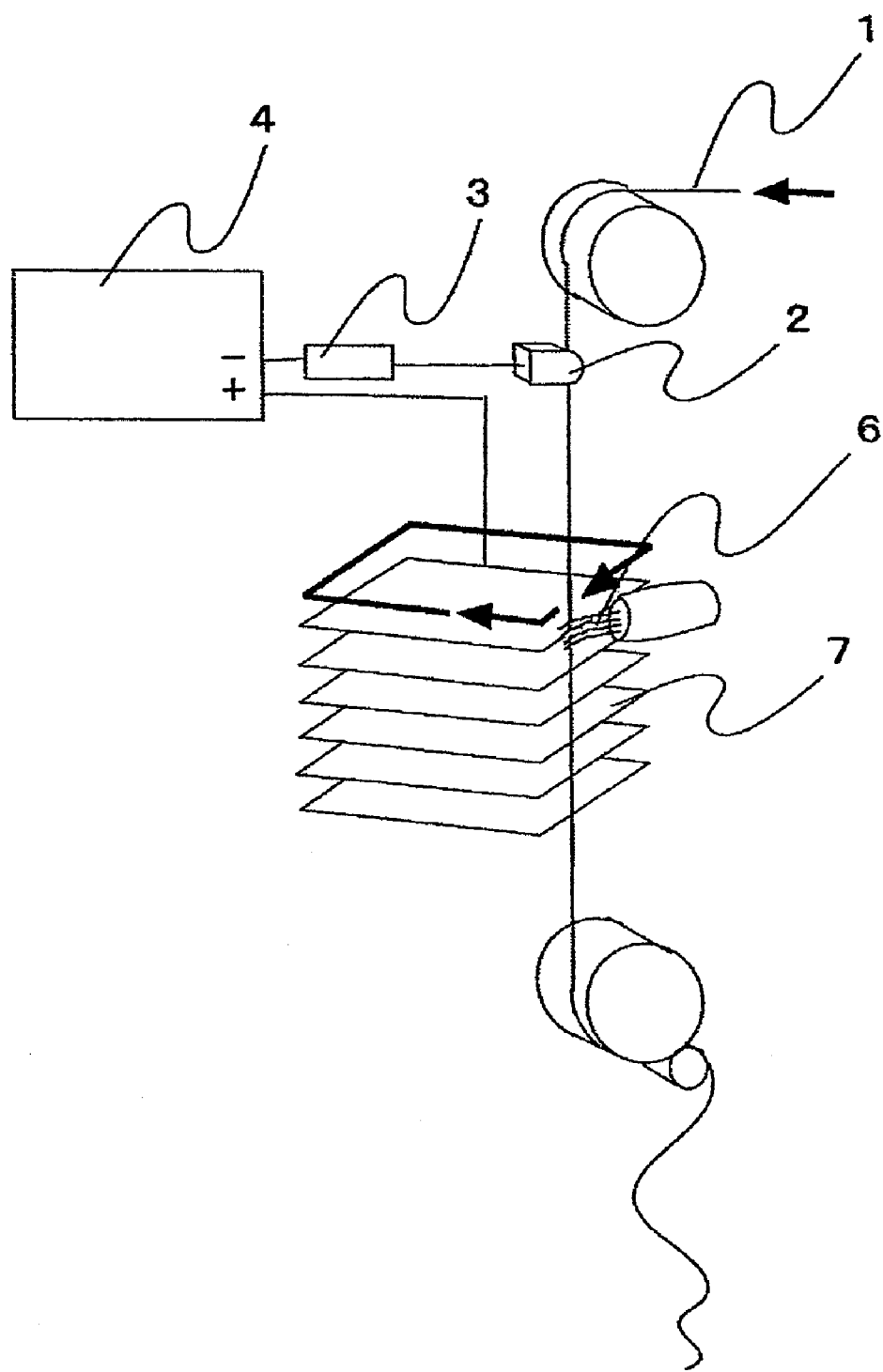
FIG. 4 is a diagram showing wire discharge machining in a p-n separating process according to a second embodiment of the present invention.

As described above, the present invention according to this application is not limited to the slice machining, but is a method that is generally useful in conducting the wire electric discharge machining on the high volume resistivity material that is represented by the solar cell silicon. In this embodiment, the electric discharge machining according to the present invention is applied to the p-n separating process during a solar cell manufacturing process. FIG. 4 shows the p-n separating process according to this embodiment.

First, the p-n separating process will be described. In general, the solar cell silicon wafer is adjusted to the p-type silicon having the high volume resistivity that is equal to or higher than 0.5 Ω·cm and equal to or lower than 5 Ω·cm, and the front surface, the rear surface, and the side surface of the wafer are made of $n^+$ type silicon that is high in conductivity by a diffusing process. The rear surface is made of $p^+$ type silicon that is high in conductivity by an aluminum electrode forming process that is subsequent to the above process. When the $p^+$ layer of the rear surface comes in contact with the $n^+$ layer of the wafer front surface that forms a light receiving surface through the $n^+$ layer of the wafer side surface, a part of electric charges that are excited on the light receiving front surface directly flows in the rear surface. As a result, the power generation efficiency is deteriorated. Under the circumstances, there is required the p-n separating process of removing the $n^+$ layer of the wafer side surface to expose a p-layer that is large in volume resistivity, thereby increasing the electric resistance of a route that extends from the light receiving surface to the rear surface side.

Up to now, a reactive ion etching that is excellent in the mass production is used for the p-n separating process. However, this embodiment adopts a wire electric discharge machining that is low in the device costs and the operation costs. That is, as shown in FIG. 4, when the electric discharge machining is conducted under the condition shown in the first embodiment while the wire is being moved along the side surface of the wafer that has been subjected to the diffusing process, the $n^+$ diffusion layer of the end surface can be removed without damaging the wafer. In principle, the wafers can be machined one by one without any problem. However, from the viewpoint of efficiency, it is preferable that a large number of wafers be stacked on each other and machined at once as shown in FIG. 4. Also, when the large number of wafers are stacked on each other, the electric discharge is dispersed without being concentrated on a narrow area on the wire. As a result, it is difficult to cause the unstable state or the machined surface damage due to the concentrated electric discharge, and the high grade machining can be stably realized. The productivity comparable with the reactive ion etching can be realized at the lower costs.

As described above, when the wafer side surface machining in the p-n separating process is implemented under the machining condition described in the first embodiment, the p-n separating process can be implemented at a practically sufficient speed with no break of the wire electrode and no damage of the wafer. Also, it is possible to greatly reduce the costs required for the purchase of the upsized and expensive device, the securing of the installation location, the maintenance of the device, and machining expendables, which are required for the p-n separating process due to the reactive ion etching which is the conventional art. Accordingly, it is possible to manufacture the inexpensive solar battery cell.

Third Embodiment

According to a third embodiment of the present invention, a texturing process is implemented with a metal component that has been attached onto the machined surface by the electric discharge machining as a mask, with respect to the silicon wafer obtained by slicing the silicon block of the high volume resistivity which is used as the solar cell through the wire electric discharge machining under the machining conditions described in the first embodiment of the present invention.

The conventional solar battery cell manufacturing process includes a slicing process of slicing a wafer from the silicon block by the aid of a wire saw using abrasive grains, and a texturing process of etching the silicon wafer obtained by the above process by the aid of an alkali solution such as KOH to form concave/convex configurations on the surface.

The texturing process is a process of forming fine concave/convex having the same size as that of the light receiving wavelength on the surface so as to reduce the reflected light from the cell surface. In general, the texturing process adopts an etching process using an alkali aqueous solution such as potassium hydrate. However, because the concave/convex that have been formed in only alkali aqueous is too large, a component such as alcohol which suppresses etching is generally mixed in the alkali aqueous to miniaturize the concave/convex configurations. However, the effects are not sufficient.

Also, since the above process is different in the degree of obtained effects depending on the crystal orientation, it is difficult to obtain the sufficient effects over the entire light receiving surface of the polycrystal silicon wafer that is widely used at present. Accordingly, an attempt has been made to apply a process having no difference depending on the crystal orientation, for example, a etching process using mixed acid or a dry etching process using reactive ion etching (RIE). However, because of those processes having no difference depending on the crystal orientation, a device is made to form a mask on the surface in advance, so that the surface is unevenly machined in order to form the concave/convex configurations on the surface by using those processes. However, because the costs are required to form the fine mask, so far those processes have not been general.

On the other hand, the volume resistivity of silicon that is used as the solar cell is in a range of the volume resistivity of the workpiece described in the first embodiment of the present invention, which is equal to or higher than 0.5 Ω·cm and equal to or lower than 5 Ω·cm. The slice machining can be conducted at a practical speed through the wire electric discharge machining that applies the machining conditions described in the first embodiment. Then, the metal component that is attributable to the wire electrode material is attached onto the wafer surface that has been thus sliced. For that reason, the metal component that has been attached onto the wafer surface which is used as the light receiving surface can be used as a mask in the texturing process. That is, the wire electric discharge machining is capable of executing the slicing process that produces the wafer and the process of attaching the metal component that can be used as the mask during the texturing process on the wafer surface that is used as the light receiving surface at the same time. As a result, it is unnecessary to additionally form a fine mask. For that reason, because unevenness occurs in the texturing process, it is possible to readily realize the finer texture configuration than the conventional one.

Subsequently, a description will be given of a relationship between the attached metal component quantity and the machining conditions. The amount of metal component that is attached onto the workpiece during the electric discharge machining is larger as the rising of the electric discharge current is larger and the electric discharge pulse width is longer. In the case where the attached metal component is excessively small in the amount, there naturally occurs such a problem that the masking action is insufficient. Similarly, in the case where the attached metal component is excessively large in the amount, because the unevenness of the attachment is damaged, there arise such problems that the masking action becomes insufficient, and the costs and time required for removal of the mask after the texturing process are increased. In a range that can machine the workpiece at a practical speed, because the metal component is attached onto the entire surface of the machined surface, the case in which the attached amount is too large causes a problem more than the case in which the attached amount is too small. Accordingly, in order to realize the appropriate attached quantity, it is necessary to set the rising of the electric discharge current to be quicker and the electric discharge pulse width to be shorter. The rising of the electric discharge current becomes quicker as the open voltage is higher and the current limit resistance is smaller. According to the experiments, in a case where the current limit resistance is set to be equal to or lower than about 16Ω when the open voltage of 150 V is applied, that is, the maximum current is set to be equal to or higher than about 10 A, there arises no problem. Also, when the electric discharge pulse width is set to the degree where silicon can be normally machined, that is, the on/off time is equal to or lower than 4 μsec, there arises no problem. Because those conditions coincide with the machining conditions according to the present invention which has been described in the first embodiment of the present invention, it can be considered that, when the silicon wafer has been sliced by the wire electric discharge machining on the basis of the machining conditions according to the present invention, the metal component that has been attached onto the machined surface has the suitability as the mask in the texturing process.

Figure 5:
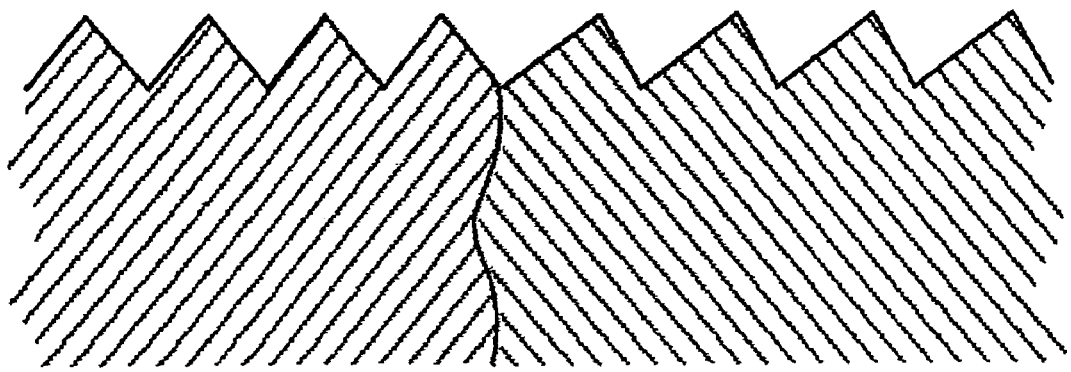
FIG. 5 is a diagram showing a surface property resulting from subjecting a wafer that has been obtained by a slice process to an etching process by alkali according to a third embodiment of the present invention.

Subsequently, a description will be given of the effects in the case where the metal that has been attached onto the wafer surface during the electric discharge machining is used as the mask to conduct the various etchings. FIG. 5 is a diagram showing a wafer section in the case where the metal that has been attached onto the wafer surface is used as the mask to conduct the etching process using an alkali aqueous solution. As shown in the figure, a surface on which the concave/convex having fine pyramid shaped cross sections at angles corresponding to the crystal orientation are integrated are formed. As has been already described above, because the metal component that has been attached onto the surface during the electric discharge machining functions as the mask to suppress the etching process, the finer concave/convex than the conventional alkali etched surface are formed. Accordingly, the visible light average reflectivity with no antireflection coating can be reduced from about 25% to about 22%.

Figure 6:
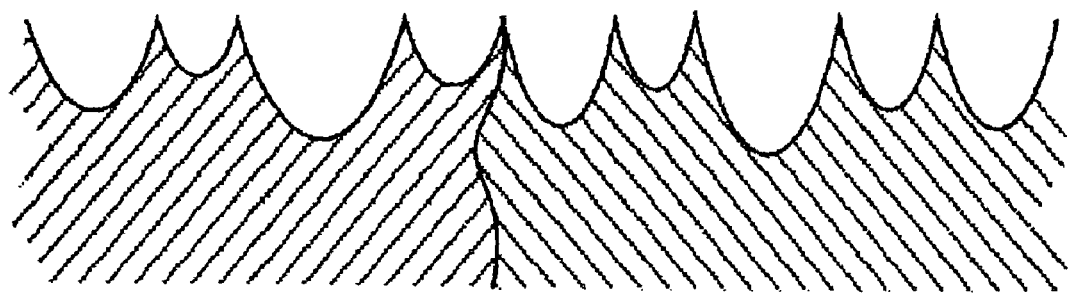
FIG. 6 is a diagram showing a surface property resulting from subjecting a wafer that has been obtained by a slice process to an etching process by mixed acid according to the third embodiment of the present invention.

FIG. 6 is a diagram showing a wafer cross section in the case where the metal that has been attached onto the wafer surface is used as the mask to conduct the etching process using a mixed acid. Because the metal component that has been unevenly attached onto the surface during the electric discharge machining functions as the mask to make the etching process uneven, the concave/convex having fine mortar-shaped sectional configurations as shown in the figure are formed on the entire light receiving surface not depending on the crystal orientation. Accordingly, the visible light average reflectivity with no antireflection coating can be further reduced to about 20%.

Figure 7:
FIG. 7 is a diagram showing a surface property resulting from subjecting a wafer that has been obtained by a slice process to a reactive ion etching process according to the third embodiment of the present invention.

FIG. 7 is a diagram showing a wafer cross section in the case where the metal that has been attached onto the wafer surface is used as the mask to conduct a dry etching process due to the reactive ion etching. In addition to the same actions as those in the case of machining using the mixed acid, the mask caused by the attached metal is sputtered, and a micro masking phenomenon that forms another finer mask occurs. As a result, as shown in the figure, the finer concave/convex are superimposed. Accordingly, the reflectivity can be reduced on all of visible light regions, and the visible light average reflectivity with no antireflection coating can be further reduced to about 18%.

As described above, according to the above method, the metal component of the wire electrode which has been attached onto the entire machined surface due to the electric discharge machining produces the masking action in the texturing process to form a texture configuration having fine concave/convex of the same degree as that of the incident light wavelength. As a result, the reflection on the light receiving surface is suppressed, thereby making it possible to realize a solar cell that is high in the power generation efficiency. Also, the slicing process is realized by the wire electric discharge process, thereby making it possible to execute the silicon slicing process and the metal component attaching process at the same time. As a result, the process can be simplified.

The remarkable effect is recognized when the material of the metal wire is brass that is generally used in the wire electric discharge machining. However, the effect can be produced not only on brass, but also on any metal such as copper, zinc, iron, nickel, chrome, cobalt, aluminum, titanium, molybdenum, tungsten, niobium, or tantalum.

Figure 8:
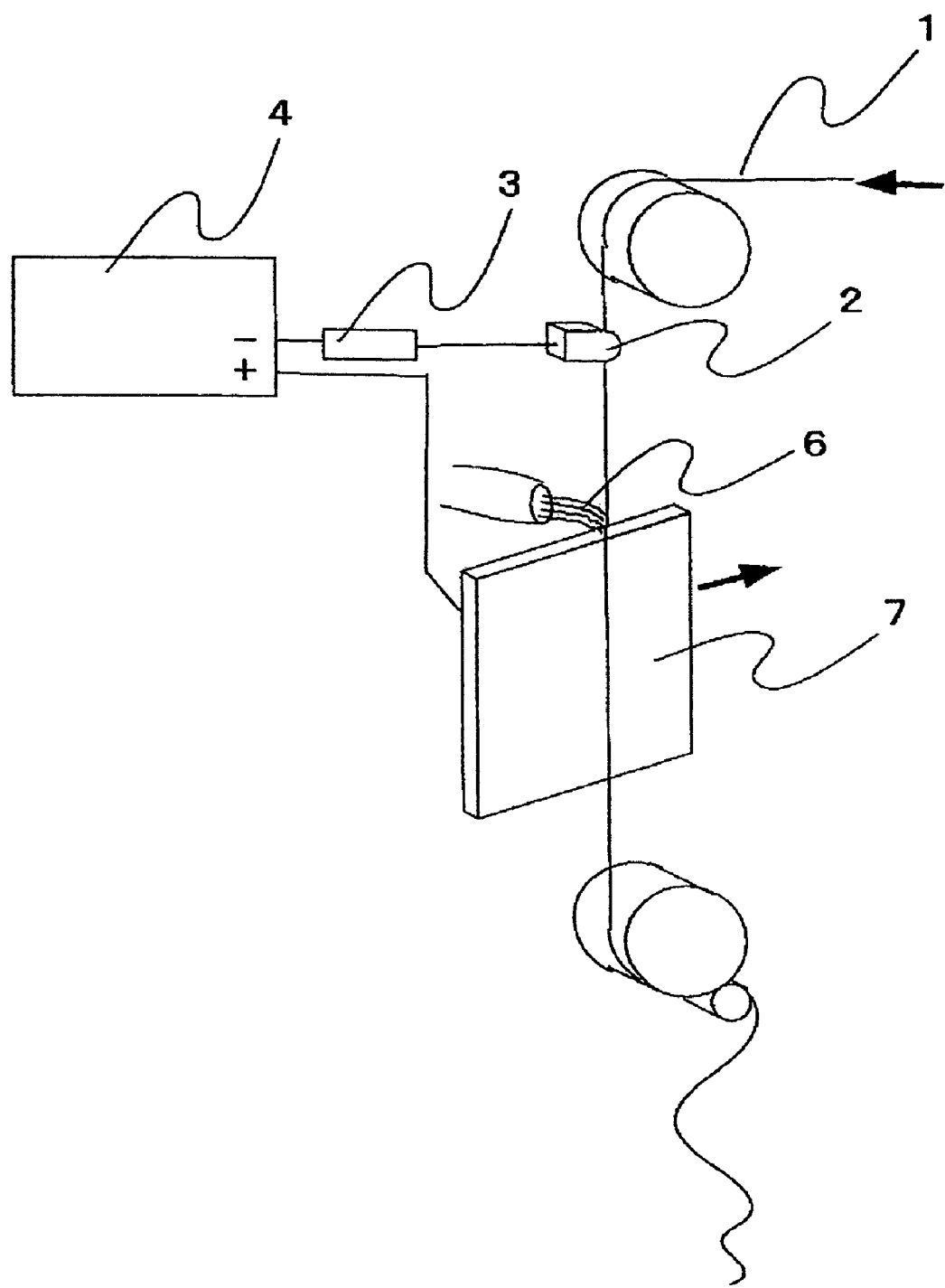
FIG. 8 is a diagram showing another wire discharge machining process according to the third embodiment of the present invention.

The same effects as those described above can be obtained even if the wafer having a surface that has been machined by generating the electric discharge while traveling a wire electrode so as to skim over the light receiving surface of the wafer that has been already shaped in a thin plate as shown in FIG. 8. According to the above configuration, the texture configuration having the fine concave/convex can be formed with respect to the wafer that has been already shaped in the thin plate configuration. As a result, the present invention is applicable not only to the wafer that has been obtained by slicing the silicon block, but also to the wafer that has been manufactured in a system having no slicing process such as a ribbon crystal lift-up system.

Figure 9:
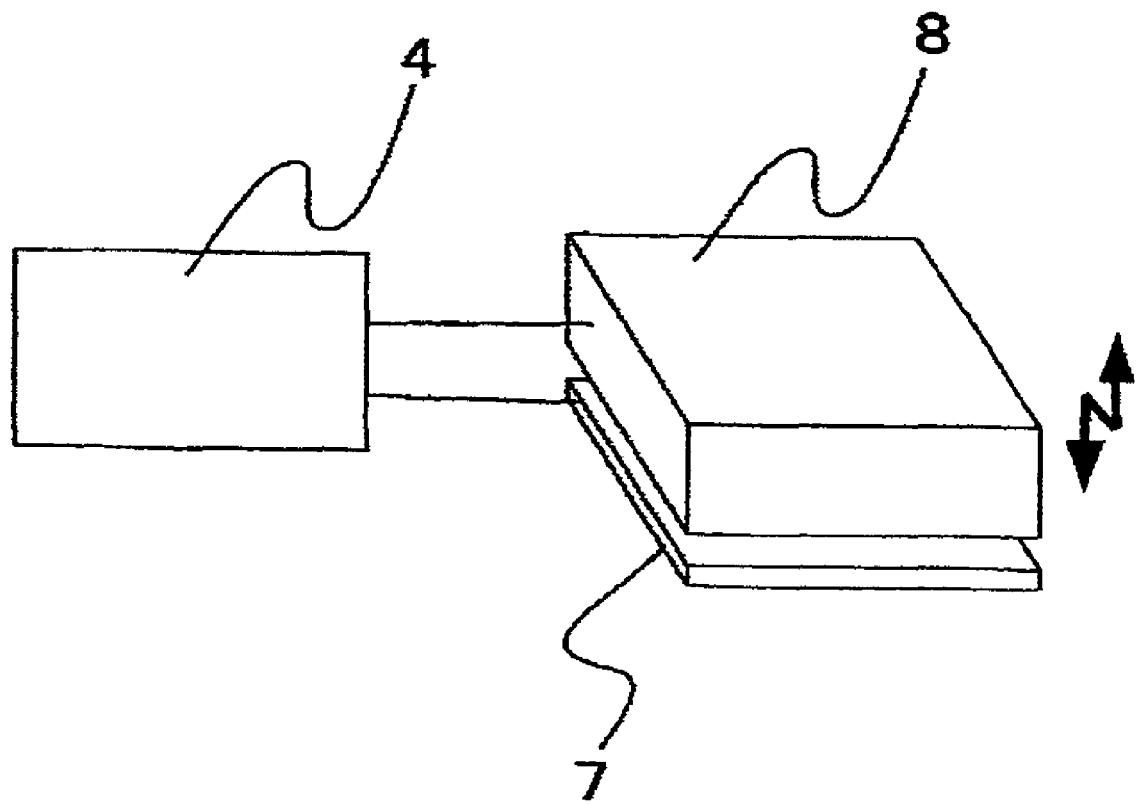
FIG. 9 is a diagram showing a die-sinking electric discharge machining process according to the third embodiment of the present invention.

Also, it is possible to use not the wire electric discharge machining but a die-sinking electric discharge machining using a solid tool electrode 8 as shown in FIG. 9. According to the above configuration, because the attachment of the metal material from the tool electrode can be executed over the entire light receiving surface at once, high speed machining can be conducted. The electric discharge can be developed by not a square tool electrode shown in FIG. 9, but a side surface of a cylinder electrode that rotates about the center axis, which is advantageous in that the machined scrap is readily exhausted.

The above description is applied to a case where the solar battery cell is made of silicon, but the solar battery cell is not always limited to silicon. As described in this embodiment, the present invention described in this embodiment can be applied to any solar battery cell accompanies the electric discharge machining and has the machined surface that is subjected to the texturing process, and the same effects as those described in this embodiment can be provided. In the case where the present invention according to this embodiment is applied to the conditions of the wire electric discharge machining defined in the first embodiment of the present invention and the scope of the workpiece, the effects are particularly remarkable because of the description of paragraph 0033.

What is claimed is:

1. A wire electric discharge machining method, comprising:
    applying a pulse voltage having a pulse width in a range from 1 μsec to 4 μsec, and having a peak current, at the time of machining with a wire electrode, in a range from 10 A to 50 A, to the wire electrode; and
    generating an electric discharge pulse between the wire electrode and an object to be machined having a volume resistivity in a range from 0.5 Ω·cm to 5 Ω·cm to machine the object to be machined.

2. The wire electric discharge machining method according to claim 1, further comprising applying to the wire electrode a group pulse waveform having a period during which no voltage is applied after the pulse voltage application is repeated in a short cycle.

3. The wire electric discharge machining method according to claim 2, wherein the period during which no voltage is applied is longer than a period during which the pulse voltage application of one group is repeated in a short cycle.

4. A semiconductor wafer manufacturing method, comprising:
    applying a pulse voltage having a pulse width in a range from 1 μsec to 4 μsec, and having a peak current, at the time of machining with a wire electrode, in a range from 10 A to 50 A, to the wire electrode;
    generating an electric discharge pulse between the wire electrode and a semiconductor material having a volume resistivity in a range from 0.5 Ω·cm to 5 Ω·cm; and
    slicing the semiconductor material to manufacture a thin-plate shaped semiconductor wafer.

5. The semiconductor wafer manufacturing method according to claim 4, wherein:
    the semiconductor material comprises p-type silicon; and
    the method further comprises settings electric potential of the p-type silicon to be higher than electric potential of the wire electrode to generate an electric discharge.

6. The semiconductor wafer manufacturing method according to claim 5, further comprising applying to the wire electrode a group pulse waveform having a period during which no voltage is applied after the pulse voltage application of one group is repeated in a short cycle.

7. The semiconductor wafer manufacturing method according to claim 6, wherein the period during which no voltage is applied is longer than a period during which the pulse voltage application of one group is repeated in a short cycle.

8. The semiconductor wafer manufacturing method according to claim 4, further comprising applying to the wire electrode a group pulse waveform having a period during which no voltage is applied after the pulse voltage application of one group is repeated in a short cycle.

9. The semiconductor wafer manufacturing method according to claim 8, wherein the period during which no voltage is applied is longer than a period during which the pulse voltage application of one group is repeated in a short cycle.

10. A solar battery cell manufacturing method, comprising:
    applying a pulse voltage having a pulse width in a range from 1 μsec to 4 μsec, and having a peak current, at the time of machining using a wire electrode, in a range from 10 A to 50 A, to the wire electrode;
    generating an electric discharge pulse between the wire electrode and a side surface of a solar cell silicon wafer that includes an $n^+$ diffused region; and
    separating a light detecting surface and a diffusion surfaces at a rear surface of the wafer by removing the $n^+$ region through a p-n separating process to manufacture a solar battery cell.

11. The solar battery cell manufacturing method according to claim 10, wherein the side surface of the solar cell silicon wafer that forms an object from which the $n^+$ region is removed comprises a plurality of side surfaces of a plurality of solar cell silicon wafers stacked on each other at the light detecting surfaces thereof.

* * * * *